Patented June 21, 1949

2,474,005

UNITED STATES PATENT OFFICE 2,474,005

2-ACETOXYBENZYL ACETYLSALICYLATE

Gustav J. Martin and Harold Urist, Philadelphia, Pa., assignors to The National Drug Company, Philadelphia, Pa., a corporation of Pennsylvania No Drawing. Application January 14, 1947, Serial No. 722,079

2 Claims. (Cl. 260—474)

It is an object of this invention to produce a new analgesic having substantial effectiveness over a prolonged period. As is well known, aspirin and related analgesics are effective for but short periods of time, and as a result they must be taken frequently if they are to serve the desired purpose.

We have found that the 2-acetoxybenzyl acetylcalicylate has analgesic properties superior to aspirin and related materials of this type, and more importantly, these properties are effective from five to ten times as long as analgesics heretofore employed.

This material may be prepared by the condensation of acetyl saligenin with acetyl salicyloyl chloride in pyridine solution. For example, to a cold solution of 16.1 grams ($\frac{1}{10}$ mole) of acetyl saligenin may be added 25 ccs. of anhydrous pyridine and $\frac{1}{10}$ mole of acetyl salicyloyl chloride. The addition may be made over a period of 15 minutes, with stirring. Stirring is continued for an additional 30 minutes and the solution is allowed to stand over night at room temperature. The reaction mixture may be dissolved in ethyl acetate and washed with 10 per cent hydrochloride, water, 10 per cent potassium bicarbonate, water, and finally dried over sodium sulfate. The solvent may be distilled in vacuo and the residue dried in vacuo. From this reaction there will be obtained about 23.2 grams of a brown oil, amounting to a yield of 70.8%.

Upon analysis the product was found to contain 8.87 cc. of N NaOH for 1 gram of compound. The theoretical would be 9.14 cc. of N NaOH for complete hydrolysis of 1.0 gram of compound. This corresponds to a purity of about 97 per cent.

It is to be understood that the conditions of the foregoing reaction may be varied without departing from the scope of this invention. In the light of the instructions heretofore given such variations would be obvious to one skilled in the art.

The compound of this invention may be administered orally, in the form of a powder, solution, or tablets. It has excellent analgesic properties and is unusual in that these properties last from five to ten times as long as those of aspirin or similar analgesics.

This compound has the following structural formula:

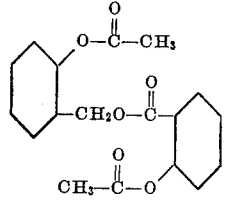

As many apparently widely different embodiments of this invention may be made without departing from the spirit and scope hereof, it is to be understood that the invention is not limited to the specific embodiments hereof, except as defined in the appended claims.

We claim:

1. A process which comprises reacting acetyl saligenin with acetyl salicyloyl chloride in the presence of pyridine, and separating the resulting 2-acetoxybenzyl acetylsalicylate from the reaction mixture.

2. 2-acetoxybenzyl acetylsalicylate.

GUSTAV J. MARTIN.
HAROLD URIST.

REFERENCES CITED

The following references are of record in the file of this patent:

Chemische Zentralblatt vol. II (1942), pages 2599–2600, Chavaux et al. (Copy in U. S. Patent Office, Scientific Library, Washington, D. C.).